UNITED STATES PATENT OFFICE.

ISAAC W. DRUMMOND, OF NEW YORK, N. Y.

INSECTICIDE.

960,287.  Specification of Letters Patent. Patented June 7, 1910.

No Drawing.  Application filed January 18, 1910. Serial No. 538,610.

*To all whom it may concern:*

Be it known that I, ISAAC W. DRUMMOND, a citizen of the United States, and a resident of the borough of Manhattan, city, county, and State of New York, have invented a new and useful form of Insecticide, of which the following is a specification.

Investigations conducted during recent years at various agricultural experiment stations and elsewhere, have demonstrated the fact that the various metallic arsenates are superior insecticides, excelling in efficiency, in many cases, paris green, now and heretofore largely employed for the purpose. The physical condition, however, in which these arsenates have heretofore been offered in trade and commerce, which has been the only condition possible, previous to my invention, has restricted the larger utilization which they deserve. The restrictions referred to are partly due to the physical characteristics of the metallic arsenates, and partly to their chemical characteristics, *i. e.*, their corrosive nature.

Under my invention I obviate all of these difficulties and present them upon the market in an attractive and relatively inexpensive manner, ready for immediate and convenient use by the consumer.

Arsenate of soda and any soluble metallic salt, such, for instance, as nitrate of lead, are well known articles of commerce, appearing upon the market usually in the form of crystals, and they are susceptible of reduction to granular or pulverulent condition. If these substances in dry powdered form be brought together and be intimately mixed in the proper chemical proportions, they will, when put into water, produce a chemical decomposition, and white precipitate of arsenate of lead will result, leaving a dissolved salt of soda in the supernatant liquor. I have discovered, however, that when these dry powdered chemicals are mixed together, there will take place more or less chemical decomposition, even in their dry state, due to their hygroscopic character and this can be prevented only by hermetically sealing the powders in a suitable air-tight receptacle, but this is undesirable, because it is not permanently efficient, since the powders, even then when in direct contact are apt to agglomerate together and form a hard mass difficult and impracticable to subsequently dissolve in water. Furthermore, the preferred manner in which to present such material upon the market, particularly in small packages, is to put it up in inexpensive cardboard or paper cartons, such as have always heretofore been used in the distribution of paris green, and these boxes or cartons being more or less porous and not air-tight, will of course be inadequate to protect the powders from humidity. I have further discovered, however, that I can overcome this agglomeration and partial chemical decomposition by adding from fifteen to twenty per cent. of cornstarch to the mixture of powdered arsenate of soda and the soluble metallic salt, since the addition of the cornstarch precludes the chemical action between the two salts by separating their respective particles and prevents any chemical action between them.

In practicing my invention, I take arsenate of soda and a soluble metallic salt in proper chemical proportions, both in finely divided or powdered condition, and when dry I mix with them from fifteen to twenty per cent., more or less, of their weight of cornstarch, also in dry powdered condition. The mixing should be thoroughly effected. The resulting mass may then be put upon the market in ordinary paper boxes or cartons, and will keep indefinitely. At the time of use, the contents of the box being emptied into water in any suitable vessel and stirred therein, chemical decomposition will immediately take place and the resulting insoluble metallic arsenate in suspension in the water, is at once ready for spraying or for other methods of application as an insecticide. There are other materials which can be used to separate the particles of the chemicals, such, for instance, as bone dust, finely powdered glue, starch, etc. I prefer, however, cornstarch.

Although I prefer to use a soluble salt of lead as the metallic ingredient, thus producing arsenate of lead, as the insecticide, still there are other materials somewhat similar to the soluble salt of lead which may be substituted therefor, notably sulfate of iron. Treating this in the same way as above, I take arsenate of soda and sulfate of iron, and thus form arsenate of iron as a precipitate, with the sulfate of soda in the supernatant liquor. In fact the soluble arsenates of various metals act well as insecticides, and it is quite probable that the arsenate of lead, although very serviceable for general use, may not be so efficient for specific uses as the arsenate of some other metal. I therefore do not limit myself to the arsenate of lead, but include the arsenates of all metals and of the alkaline earths.

I call particular attention to the fact that an adhesive substance, such as cornstarch, or equivalent material, performs dual functions. It serves not only as a segregator to keep the particles of the dry powdered chemicals apart, but it also acts as an agglutinant to attach the particles of the resulting precipitate of insoluble metallic arsenate more firmly to the foliage or stems of the plants on which it has been applied.

I claim:

1. An insecticide composed of arsenate of soda, a soluble salt of lead, and a segregating material, all in dry powdered condition.

2. An insecticide composed of arsenate of soda, a soluble salt of lead, and a segregating and adhesive material, all in dry powdered condition.

In testimony whereof I have signed my name to this specification in the presence of two subscribing witnesses.

ISAAC W. DRUMMOND.

Witnesses:
WILLIAM H. PHILLIPS,
H. V. C. MEYER.